US010596443B1

(12) United States Patent
Pomroy

(10) Patent No.: US 10,596,443 B1
(45) Date of Patent: Mar. 24, 2020

(54) ADJUSTABLE CARRYING BAG FOR A LEASH OR ROPE

(71) Applicant: Dana Pomroy, Albuquerque, NM (US)

(72) Inventor: Dana Pomroy, Albuquerque, NM (US)

( * ) Notice: Subject to any disclaimer, the term of this patent is extended or adjusted under 35 U.S.C. 154(b) by 0 days.

(21) Appl. No.: 15/945,103

(22) Filed: Apr. 4, 2018

Related U.S. Application Data

(60) Provisional application No. 62/481,410, filed on Apr. 4, 2017.

(51) Int. Cl.
*A63B 71/00* (2006.01)
*B65D 33/10* (2006.01)
*A01K 27/00* (2006.01)
*B65D 33/25* (2006.01)

(52) U.S. Cl.
CPC ........ *A63B 71/0036* (2013.01); *A01K 27/008* (2013.01); *B65D 33/105* (2013.01); *B65D 33/25* (2013.01); *A01K 27/003* (2013.01)

(58) Field of Classification Search
CPC .............. A63B 71/0036; A01K 27/008; B65D 33/105; B65D 33/25
USPC ...................... 383/13, 16, 21, 22, 24, 38, 40
See application file for complete search history.

(56) References Cited

U.S. PATENT DOCUMENTS

| 5,441,017 | A | * | 8/1995 | Lindsay | ............... A01K 27/003 119/161 |
| 5,560,321 | A | | 10/1996 | Hess | |
| 5,727,500 | A | * | 3/1998 | Conboy | ............... A01K 23/005 119/174 |
| D393,504 | S | * | 4/1998 | Eisman | ........................... 383/22 |
| 5,890,637 | A | * | 4/1999 | Furneaux | ............. A01K 27/001 224/191 |
| 6,035,809 | A | | 3/2000 | Fingerett et al. | |
| D425,266 | S | * | 5/2000 | Rubinstein | ................... D30/153 |
| 6,182,877 | B1 | * | 2/2001 | Rolfe | ....................... A45B 1/00 135/66 |
| 6,418,881 | B1 | | 7/2002 | Starratt | |
| 6,651,683 | B1 | * | 11/2003 | Hooks | ....................... A45F 5/00 135/66 |
| 9,078,417 | B1 | | 7/2015 | Lees et al. | |
| 2004/0081373 | A1 | * | 4/2004 | Nykoluk | .................. A45C 3/00 383/2 |
| 2008/0054040 | A1 | * | 3/2008 | Tanaka | ................. A01K 27/006 224/637 |
| 2009/0095225 | A1 | | 4/2009 | O'Connell | |
| 2011/0180016 | A1 | | 7/2011 | Wheeler et al. | |
| 2011/0220675 | A1 | | 9/2011 | Barton | |

(Continued)

OTHER PUBLICATIONS

"Bogg—Dog walking bag. Poo bag dispenser & waste carrier | holder | roll", http://www.ebay.co.uk/itm/bogg-dog-poo-bag-dispenser-waste-carrier-poop-pick-up-holder-roll-/182428571151, Feb. 18, 2017.

(Continued)

*Primary Examiner* — Jes F Pascua
(74) *Attorney, Agent, or Firm* — Peacock Law P.C.; Justin R. Muehlmeyer

(57) ABSTRACT

A carrying apparatus for containing objects such as animal waste attachable to a line, such as an animal leash or a climbing rope. Embodiments of the carrying apparatus can include a bag, a strap, one or more loops, and can coordinate with a line. The carrying apparatus preferably also includes a secondary container, which itself can include an outlet formed on a sidewall thereof.

17 Claims, 4 Drawing Sheets

(56) References Cited

U.S. PATENT DOCUMENTS

| | | | |
|---|---|---|---|
| 2012/0186539 A1 | 7/2012 | Johnston | |
| 2012/0286003 A1 | 11/2012 | Shadday et al. | |
| 2015/0257370 A1* | 9/2015 | Craig | A01K 27/008 224/218 |
| 2016/0023807 A1* | 1/2016 | Tappan | A01K 27/008 383/120 |
| 2016/0052712 A1 | 2/2016 | Jackson-Tyree | |
| 2016/0135432 A1 | 5/2016 | Cox | |
| 2017/0002531 A1 | 1/2017 | Byham | |
| 2017/0360009 A1* | 12/2017 | Anderson | A01K 27/008 |

OTHER PUBLICATIONS

"Dog Pick-Up Bags", https://www.4-legged.com/dog-pick-up-bags/, 2011.

"Fozzy Dog Leash—The Mini Double", http://bekindliving.com/products/fozzydog-dog-leash-the-mini-double, Aug. 10, 2015.

"Poo Doo Pouch", https://www.poodooleash.com/product/retractible-leashes/, Apr. 22, 2013.

Rachael, "Turdlebag Leash Attachment—Hands Free, Stink Free!", https://mydoglikes.com/turdlebag-dog-leash-attachment-review/, Apr. 19, 2016.

"Wellbro Fashional Dog Poop Bag Dispenser, Leash Attachment Pet Poop Bag Holder, 4.8 Height by 2.8 Width, Included 3 Rolls of Waste Bag", https://www.amazon.com/Wellbro-Fasional-Attachment-Lightweight-Convenient/dp/B01MCTCLDX—Downloaded Mar. 21, 2017.

"Your Perfect Treat Pouch-Leash Mounted Dog Treat Pouch-Poop Bag Dispenser-Tennis Ball Carrier-Magnetic Closing-With Belt Clip and Velcro Secured Pocket", https://www.amazon.com/Your-Perfect-Treat-Pouch-Dispenser/dp/B01ETWJRBW—Downloaded Mar. 21, 2017.

* cited by examiner

ADJUSTABLE CARRYING BAG FOR A LEASH OR ROPE

CROSS-REFERENCE TO RELATED APPLICATIONS

This application claims priority to and the benefit of the filing of U.S. Provisional Patent Application No. 62/481,410, entitled "Animal Waste Leash Bag", filed on Apr. 4, 2017, and the specification and figures thereof are incorporated herein by reference.

BACKGROUND OF THE INVENTION

Field of the Invention (Technical Field)

Embodiments of the present invention relate to a bag attachable to a line, for example an animal leash or a climbing rope, for containing objects that can include, for example, animal waste and/or any other objects.

Description of Related Art

There are a number of situations in which a person using a rope or leash needs to carry objects or contain animal waste while keeping both hands free. For example, taking your dog for a walk often poses the problem of picking up the dog's waste and carrying the waste for the remainder of the walk. Because one of the user's hands is already committed to holding the dog's leash, the user's remaining hand then becomes committed to carrying the animal waste, most commonly using a disposable animal waste bag or plastic grocery bag. Attaching such disposable bags to the leash is problematic, often resulting in the bag sliding down the length of the leash or falling off the leash entirely. With both hands committed to important tasks, it becomes problematic to carry or handle other objects including but not limited to keys, mace, phones, etc. In another example, a utility pole or antenna climber, who is hanging or climbing using a rope, needs to have both hands free either to climb or to perform certain functions, but also needs access to a bag to contain waste and/or other objects.

Animal waste carrying bags that attach to leashes that are currently available suffer several problems. Some bags attach to leashes too close to the user's hand, creating the uncomfortable feeling of having a hand close to the animal waste. Some bags slide too far down the leash. Some bags hang down from the leash at angle that is either uncomfortable to support or that creates a risk of spillage of the contents of the bag. Bags for climbers also suffer similar problems.

What is needed is a reusable bag for containing materials like animal waste and/or other objects that attaches to the line in use like a dog's leash or a climbing rope that does not slide down the leash but can be kept at an appropriate distance from the user's hand.

BRIEF SUMMARY OF THE INVENTION

Embodiments of the present invention comprise a carrying apparatus attachable to a line such as a leash or a rope that permits its user the ability to adjust and control the location of the carrying apparatus on the leash or rope. An embodiment of the present invention also relates to a carrying apparatus having a bag with a first compartment, the first compartment having an open top end, a bottom end opposite the top end and at least one sidewall; a first attachment loop disposed on an upper portion of the at least one sidewall; a second attachment loop disposed between the first attachment loop and the bottom end of the bag; an attachment strap having a first end portion and a second end portion, where the first end portion can be attached to an upper portion of one of the at least one sidewall and the second end portion can be attached to the bag via one or more fastener components; and a second compartment, formed onto an outer portion of one of the sidewalls, the second compartment having an open top, a closed bottom and an outer sidewall.

Embodiments of the carrying apparatus can also include any of the following features: the second attachment loop disposed in a middle portion of the sidewall of the carrying apparatus; the attachment strap having a total length of between two to twelve inches; the fastener components positioned such that when the second end portion of the strap is attached to the bag via the fastener components, the strap forms a loop that projects above the open top end of said first compartment by at least one inch; an outlet disposed on the outer sidewall of the second compartment; an outlet including a grommet; attachment loops including elastic material; a handle at or near the bottom end of the first compartment; the bag, second compartment, first and second attachment loops, and the attachment strap including nylon material; the fastener components being snap buttons; and an elastic band at or near the top end of the second compartment.

An embodiment of the present invention also relates to a container having a first compartment, which itself includes an open top and a closed bottom; a second compartment formed on an outer side of the first compartment having an open top, a closed bottom, and an outlet formed in a side thereof; a first set of fastener components configured to close the open top of the first compartment; at least one loop, the loop configured such that it can encircle a vertically-oriented line when the container is disposed with the open top of the first compartment disposed directly above the closed bottom of the first compartment; and a strap configured to form a loop which can encircle a horizontally-oriented line disposed adjacent to the open top of the first compartment.

Embodiments of the container can also include any of the following features: a first loop of the at least one loop disposed on the first compartment at or near its open top, and a second loop of the at least one loop disposed on the first compartment between the first loop and the closed bottom of the first compartment; a second set of fastener components disposed on the strap and the container configured to removably secure the strap to the container; one of the at least one loop including elastic material; and a handle at or near the closed bottom of the first compartment.

An embodiment of the present invention also relates to a method of forming a line-attachable bag including forming a first compartment having an open top end, a closed bottom end opposite the top end and one or more sidewalls; disposing first and second attachment loops on at least one of the one or more sidewalls such that the first and second loops each encircle a respective one of at least substantially vertical axes when the line-attachable bag is positioned with the open top end of the first compartment directly above the closed bottom end of the first compartment; attaching to the first compartment a first end portion of an attachment strap; providing a first fastener component on a second end portion of the strap, the first fastener component configured to communicably couple to a second fastener component disposed on the first compartment, and wherein when so communicably coupled, the attachment strap forms a loop that encircles an at least substantially horizontal axis; and forming a second compartment having an open top and a closed bottom by attaching a material to an outer portion of at least one of the one or more sidewalls of the first compartment.

Embodiments of the method of forming a line-attachable bag can also include any of the following: disposing the first attachment loop on an upper portion of at least one of the sidewalls and disposing the second attachment loop near a middle portion of at least one of the sidewalls; forming the second compartment to include an outlet in its sidewall; positioning the first and second fastener components such that when the second end portion of the strap is attached to the bag via the first and second fastener components, the strap forms a loop that can extend at least one inch above the open top end of the bag.

Objects, advantages and novel features, and further scope of applicability of the present invention will be set forth in part in the detailed description to follow, and in part will become apparent to those skilled in the art upon examination of the following, or may be learned by practice of the invention.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Embodiments of the present invention are not limited to use with animal leashes, but can be used with any leash or rope, and are particularly useful in situations in which a user is using a rope and needs both of their hands free, for example, climbers. Accordingly, terminology used to describe any particular embodiment for any particular use should not be interpreted as limiting the invention. As is used herein, the terms "line", "leash" and "rope" are interchangeable, and individually and collectively hereinafter are intended to mean any supporting or restraining object including a rope, belt, leash, line, cord, elongated flexible member or group thereof, combinations thereof and the like—regardless of the intended use of the line, leash, and/or rope. The term "strap" is also intended to include any elongated flexible member, including but not limited to a line, rope, leash, belt, band, tie, string, cord, combinations thereof, and the like.

Referring to the figures, bag 10 according to an embodiment of the present invention includes a first compartment 12 having an opening for receiving contents and one or more walls for containing the contents within first compartment 12. First compartment 12 preferably includes a top and a bottom, the top being open in order to receive contents and the bottom comprising a material that forms the base of bag 10 to support the contents within bag 10. Bag 10 can be used to secure bags of animal waste within first compartment 12, in which case bag 10 preferably attaches to a line 40 that is the animal's leash.

Figure 2:
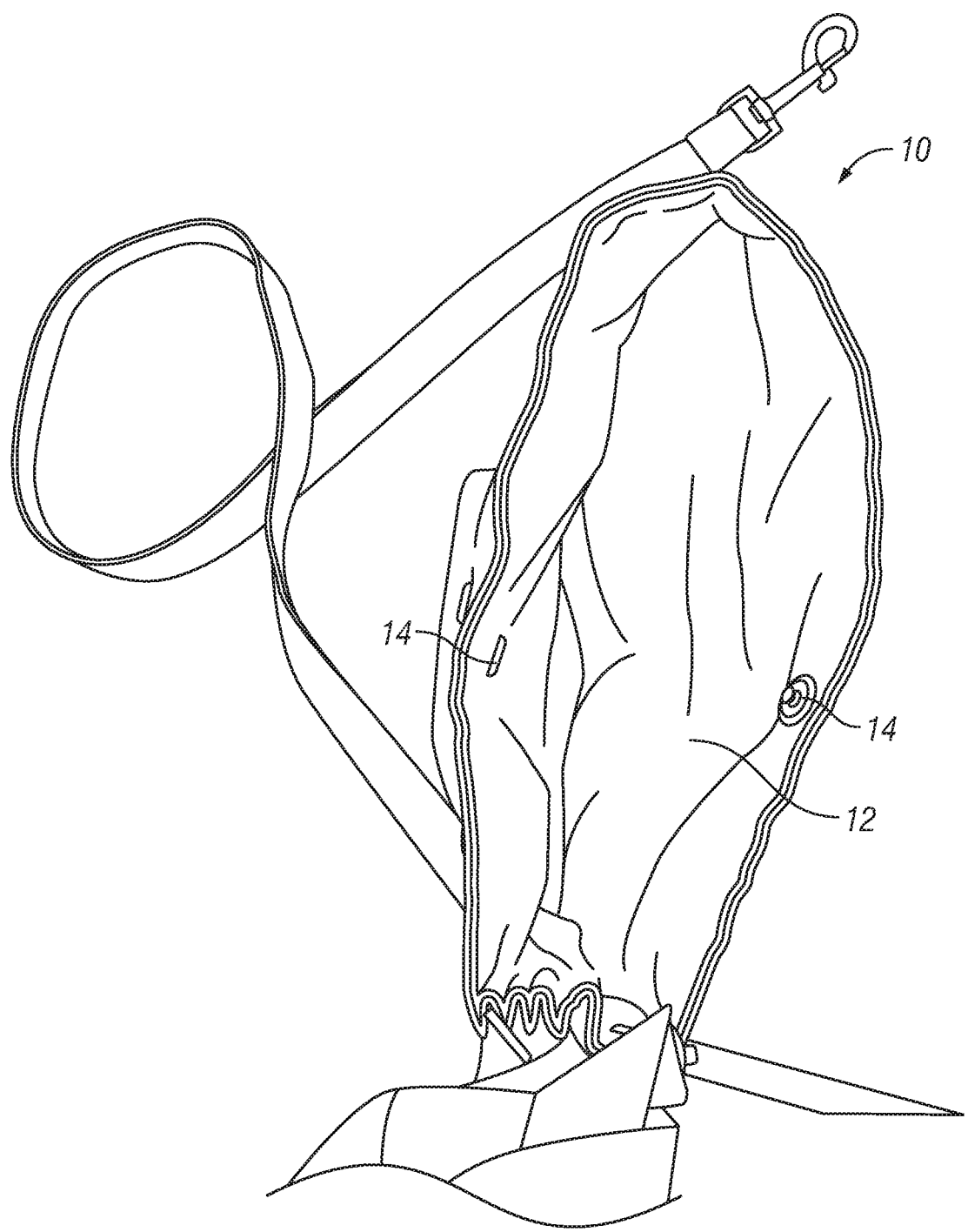
FIG. 2 is a perspective view looking down into the opening of an animal waste bag attached to a leash according to an embodiment of the present invention.
Figure 3:
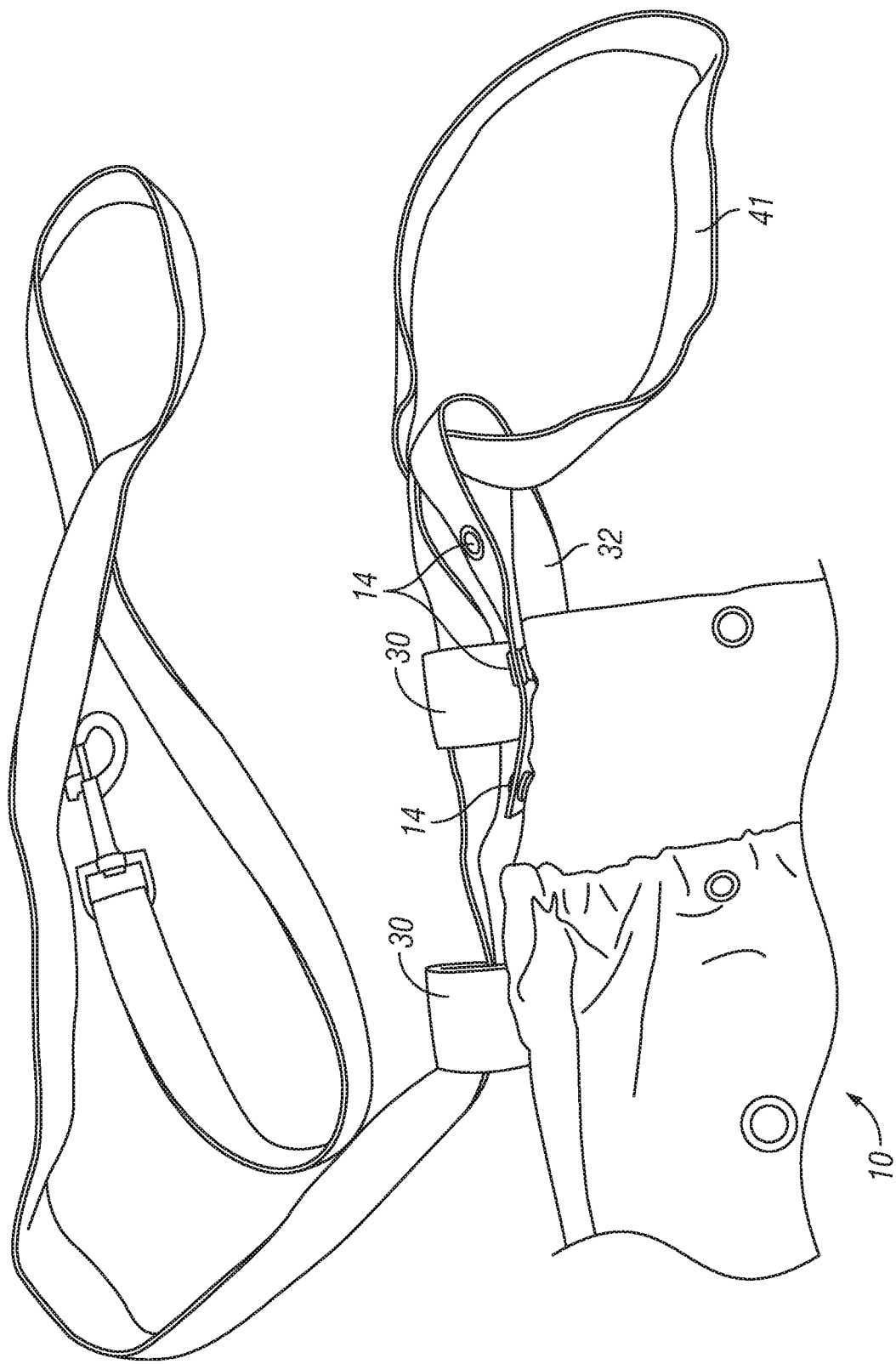
FIG. 3 is a perspective view of a leash attachment of an animal waste bag attached to a leash according to an embodiment of the present invention.
Figure 4:
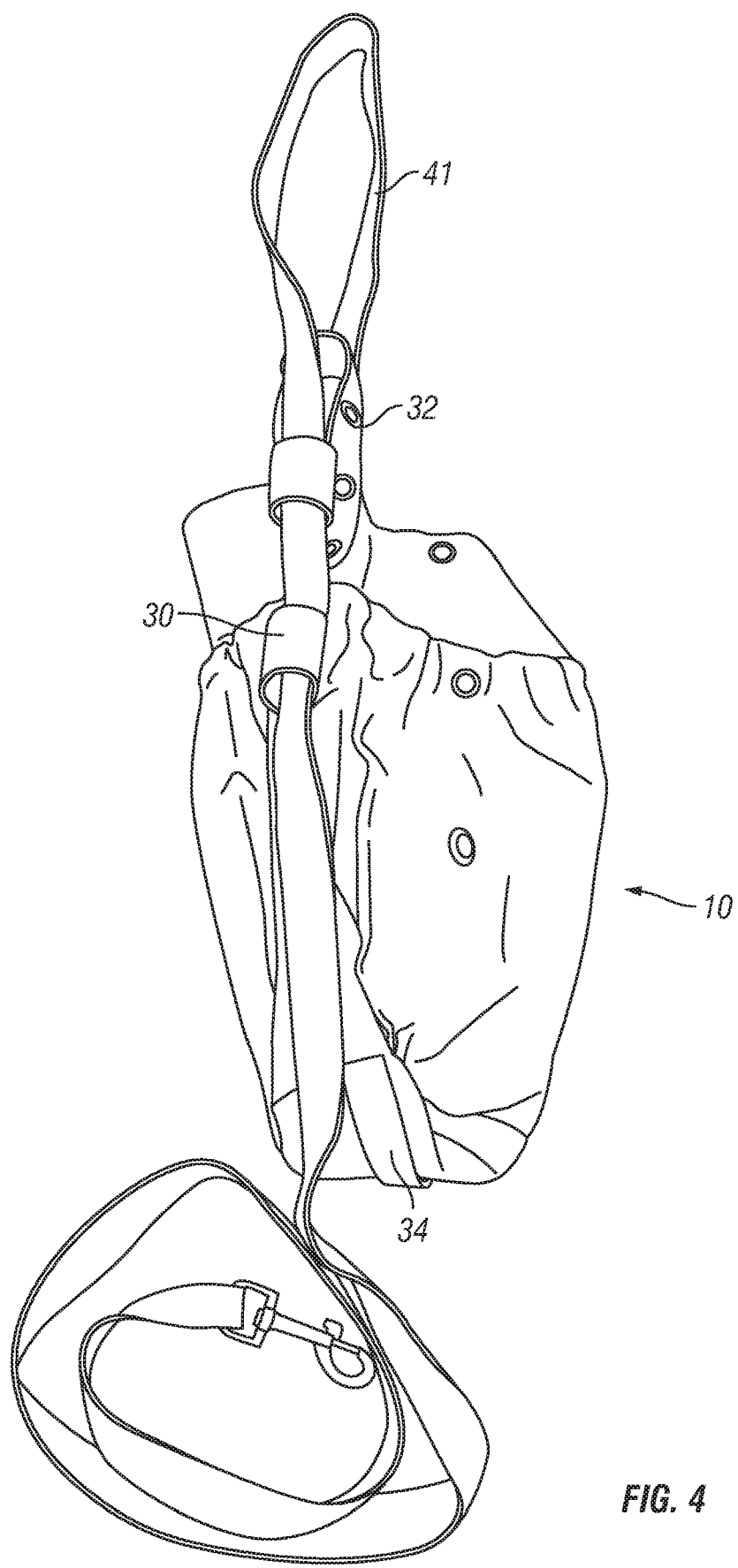
FIG. 4 is a perspective view looking down at the spine of an animal waste bag attached to a leash according to an embodiment of the present invention.

To prevent the contents of first compartment 12 from falling out while bag 10 is in use, preferably the opening of first compartment 12 is located at the top end of bag 10 and the base at its bottom, when bag 10 is held in its most preferred operating orientation, and the opening is preferably capable of being closed by coordinating fastener components 14. Preferably, fastener components 14 are snap buttons, but can be any attachment device that is securable, including but not limited to hook and loop fasteners, zippers, buckles, clips, clamps, magnetic enclosures, ties, combinations thereof, and the like. As best viewed in FIG. 2, fastener component 14 is preferably disposed on, incorporated into, or otherwise communicably coupled to a first wall of first compartment 12 to correspond with a coordinating fastener component 14 on the opposite side of first compartment 12 such that when the two are engaged, they are secured together, and when disengaged, are independent of the other. Embodiments of bag 10 can employ other mechanisms, structures, or methods for securing or sealing the opening of first compartment 12, with any number of securing mechanisms or components on any one or more walls of first compartment 12.

A bag 10 of an embodiment of the present invention can comprise one or more secondary compartments 20. Preferably, a secondary compartment 20 is formed by material attached to first compartment 12, and is of a size capable of containing objects, including rolls of disposable animal waste bags, cell phones, keys, etc. Optionally, secondary compartment, 20 can include an opening through which objects including rolls of disposable animal waste bags, keys, cell phones etc. can be received, and can include an apparatus or other structure for securing objects within compartment 20. For example, fastener components 14 and/or elastic band 15 can be embedded within, configured within, and/or attached to the material of secondary compartment 20.

Figure 1:
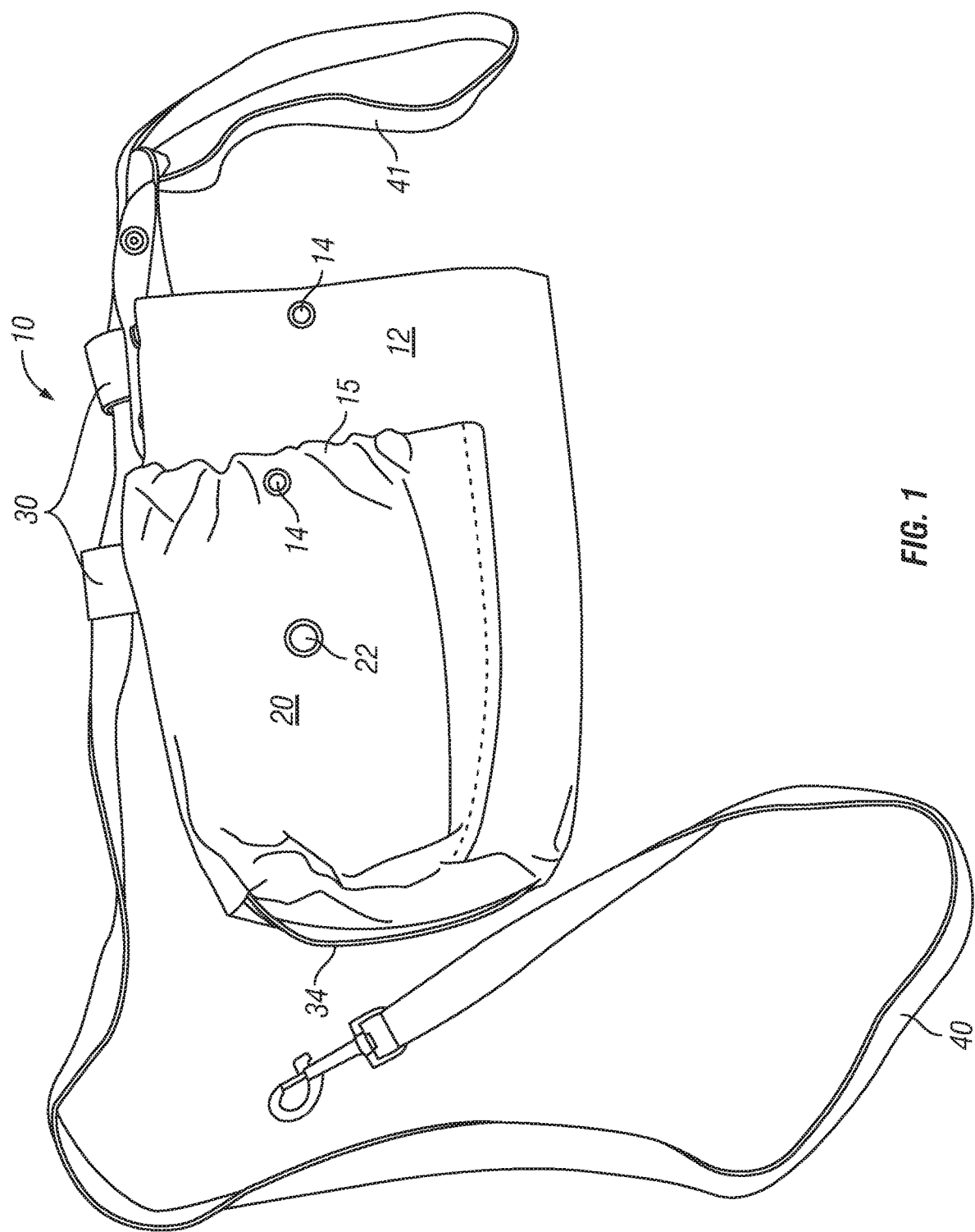
FIG. 1 is a perspective view looking at a side of an animal waste bag attached to a leash according to an embodiment of the present invention.

As best seen in FIG. 1, embodiments of bag 10 can comprise outlet 22, which can optionally be an animal waste bag dispenser outlet. Disposable animal waste bags are usually a thin plastic material that can be passed through a small hole. Preferably, such bags can be dispensed through outlet 22, which can optionally comprise a grommet that can optionally be formed from a plastic or metal material. Embodiments of outlet 22 can comprise any structure for forming and reinforcing a hole through which objects can pass, including a hole formed and reinforced by sewing.

Embodiments of bag 10 can include any number of secondary compartments 20 on any location on bag 10. Optionally none, one, more than one, or even all of secondary compartments 20 can include a corresponding outlet 22. Preferably, bag 10 comprises two secondary compartments 20, one on each side of bag 10, so that the user of bag 10 can access contents thereof, which can optionally include, for example, a disposable animal waste bag, from either side of bag 10 depending on with which hand the user is holding line 40, or so that the user can use one secondary compartment 20 for disposable animal waste bags and the second compartment 20 for holding other objects, including but not limited to keys or a cell phone.

Embodiments of bag 10 comprise at least one attachment loop 30 to enable bag 10 to be removably securable to line 40. Preferably, line 40 is inserted through at least one attachment loop 30 attached to bag 10 to allow bag 10 to hang from line 40, for example when the line is a leash in use with a dog. To support bag 10 on line 40 at a desired angle in relation to line 40, one attachment loop 30 is preferably located on bag 10 near the top open end of bag 10 and a second attachment loop 30 is located on bag 10 in a location further down bag 10 toward its bottom end along the natural path of the leash (this path of alignment of each attachment loop 30 can be referred to herein as the "spine" of bag 10). The distance between any given attachment loop 30 will determine the angle at which the axis of bag 10 hangs down towards the ground in relation to the line 40 (the axis of bag 10 being along its length from its open end to its closed end). For example, if bag 10 comprises only one leash attachment strap located at the very top end of bag 10, the axis of bag 10 will more often point down at a larger angle to line 40, meaning that it will appear to "hang" more. On the other extreme, if bag 10 comprises at least one attachment loop 30 located at the very top end of bag 10 and at least one attachment loop 30 located at the very bottom end of bag 10, the axis of bag 10 will more often align parallel with line 40, meaning that it "hangs" less because the entire length of bag 10 is secured to the leash.

Embodiments of bag 10 can comprise any number of attachment loops 30 so long as line 40 can support bag 10 when the attachment loops 30 are coordinated with line 40. One of the most desired configurations of bag 10 comprises two attachment loops 30, one located at or near the top end of bag 10 and the other located at or about halfway down the length of bag 10, as is be best viewed in FIG. 1. This configuration puts the axis of bag 10 at an angle in relation to line 40 that prevents spillage of the contents of bag 10 while in operation. Attachment loops 30 can comprise an elastic material to coordinate with variously sized lines 40.

Line 40 preferably comprises a loop 41 at one of its ends, which can comprise a loop formed of line 40 in any manner, for example, by looping the material of line 40 in on itself, or can comprise additional loop structures, for example, carabiners, elastic bands, etc. To prevent bag 10 from sliding down line 40, embodiments of bag 10 preferably comprise at least one attachment strap 32 to coordinate with a loop 41 of line 40. Preferably, attachment strap 32 comprises an adjustable length strap that loops through loop 41 of line 40, thereby preventing bag 10 from sliding too far down the length of line 40. Preferably, a first end of attachment strap 32 is attached to bag 10 at or near the top end of bag 10 in a fashion that is not removeable (for example, by it being sewn to bag 10), the opposite second end of attachment strap 32 is not attached to bag 10, and attachment strap 32 comprises fastener components 14 to coordinate with fastener components 14 on bag 10 so that the second end can be removably attached to bag 10 using the fastener components 14. In this way, the free end of attachment strap 32 can be inserted through the loop 41 of line 40, and can be attachable to and removable from bag 10 using fastener components 14. Embodiments of attachment strap 32 can comprise a plurality of fastener components 14 to allow the user to adjust the location that bag 10 hangs down from line 40. Attachment strap 32 can be of any length, but is preferably configured such that bag 10 does not slide so far down the leash that it is not within arm's length of the user. Preferably attachment strap 32 is about two to 24 inches in length, and most preferably five to seven inches in length. Embodiments of bag 10 can comprise any number of attachment straps 32 and attachment strap 32 can attach to any part of bag 10.

To allow the user of bag 10 to dispose of the contents of first compartment 12 without touching the contents, embodiments of bag 10 can optionally comprise a disposal handle strap 34 that allows the user to hold bag 10 in an inverted orientation to allow the contents to fall out of first compartment 12. Preferably, a disposal handle strap 34 is attached to the outside of bag 10 at the bottom end of bag 10 opposite the opening of compartment 12, the strap of a length that allows a person to wrap their fingers around the strap. Embodiments of bag 10 can comprise any number of disposal handle straps 34 and disposal handle straps 34 can attach to any part of bag 10. Objects that can include keys can optionally be attached to strap 34.

Embodiments of bag 10 are preferably formed of materials that are light, re-usable, machine washable, and flexible, for example sports nylon fabric or other fabrics formed of synthetic polymers, polypropylene, polyester, combinations thereof and the like. Preferably, all components of bag 10 are formed of durable and machine-washable material or materials such as sports nylon fabric and/or nylon webbing so that bag 10 can simply be put through a machine washer without alteration. Leather, cotton fabrics or other types of polymer fabrics can be used as the material for any part of bag 10, and any combinations thereof. Bag 10 can be lined with additional layers of material, for example, silicone lining to provide insulation. Embodiments of bag 10 can be of any shape, including rectangular or cylindrical; can be of materials having different rigidities; can be of varying sizes; and can be of any color or appearance. Components of bag 10 can be attached to bag 10 by any connection mechanism, including sewing, staple, glue, snap buttons, Velcro, combinations thereof, and the like.

Embodiments of bag 10 can be used with ropes or leashes other than animal leashes. For example, the user can be a climber that attaches bag 10 to a vertically oriented rope. In such embodiments, attachment strap 32 can be looped through a carabiner, Prusik cord, and/or loop within or on the rope being climbed to prevent bag 10 from sliding down the rope. Attachment loop 30 can be detachable without having to pass the entire rope through it, for example by virtue of attachment loop 30 being disengageable on at least one of its ends from bag 10. As another example, bag 10 can be attached to a user's belt. Bag 10 can also be attached to the straps of a stroller, in which case line 40 can be simply a strap of the stroller. Bag 10 can be used to secure drink products within first compartment 12, in which case compartment 12 can be sized appropriately to contain drinks and can be lined with an insulating material.

Examples

The present invention is further illustrated by the following non-limiting example of an animal waste leash bag and method of making and using it.

An animal waste leash bag was manufactured by cutting a rectangular piece of double-layered nylon fabric about nine inches in length and six inches in width and a circular piece of double-layered nylon fabric about three inches in diameter. A first end of the rectangular piece of material was sewn to its opposite second end. This created a cylindrically shaped loop with two open ends having a length of about six inches. One of the open ends was then closed off to form a bag by sewing the circumference of the circular shaped material to one end of the loop. The open end of the bag was made closeable by sewing coordinating snap buttons into the material of the bag near its open end.

To form secondary compartments, two pieces of rectangular double-layered fabric, each having a small hole formed by a grommet and each having an elastic band sewn along one side of the rectangular material between the two layers of material, were sewn to the outside of the bag on opposite sides of the bag.

To form attachment loops, both ends of each of two strips of nylon webbing fabric, each about two inches in length and half an inch in width, were sewn to the bag, one at the top end of the bag and the other about halfway down the length of the bag along a straight line. Each strip was sewn one end to its opposite end to form a loop through which a leash could be passed that would pass through both loops.

To form an attachment strap, one end of a third strap, about six inches in length, was sewn near the open end of the bag. On the third strap, three male snap buttons were placed—each about one inch from the other starting at the free end of the strap. Two female snap buttons were attached to the bag at or near its open end, about one inch from each other, to receive two of the three male snap buttons on the third strap.

A person walking a dog with a leash inserted the collar hook end of the leash through the two attachment loops on the bag. In this way, the leash when used with the dog could support the bag off the ground. To prevent the bag from slipping down the leash, the person grabbed the free end of the attachment strap, inserted it through the loop handle of the leash, looped the attachment strap around the leash loop, and secured the free end of the attachment strap with the male snap buttons to the female snap buttons on the bag.

The person placed a roll of disposable animal waste bags in a secondary compartment on the bag and inserted a free end of a disposable animal waste bag through the grommet hole in the material of the secondary compartment from inside the secondary compartment such that the roll of disposable animal waste bags was contained in the secondary compartment but a disposable waste bag could be obtained from outside the secondary compartment through the grommet. In the other secondary compartment, the person placed their house keys and closed the open end of the secondary compartment by snapping a male snap button on the inside of the secondary compartment to a female snap button on the outside of the bag.

While walking the dog, the leash supported the bag hanging from the leash while the bag stayed near the handle of the leash and did not fall along the length of the leash. When the dog produced waste, the person dispensed a disposable animal waste bag through the grommet of the secondary compartment, placed the waste in the disposable animal waste bag, placed the disposable animal waste bag into the opening of the animal waste leash bag, and closed the opening by snapping a snap button to prevent the disposable animal waste bag containing animal waste from falling out. When the walk was over, the person released the animal waste leash bag from the leash by undoing the snap buttons on the attachment strap that was looped through the leash handle loop. The person opened the animal waste leash bag by pulling apart the snap buttons and turning the entire animal waste leash bag upside down by holding the disposal strap at the end of the bag opposite the opening of the animal waste compartment to allow the disposable animal waste bag to fall out of the opening and into a trash receptacle.

After a number of different walks, the person washed the bag by placing it in a machine washer and continued to use it on future walks.

Note that in the specification and claims, "about" or "approximately" means within twenty percent (20%) of the numerical amount cited. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and and/or reconfiguration of their relationships with one another.

What is claimed is:

1. A carrying apparatus comprising:
   a bag comprising a first compartment, said first compartment comprising an open top end, a bottom end opposite said open top end and a sidewall comprising a spine;
   a first attachment loop disposed on said spine of said sidewall;
   a second attachment loop disposed on said spine of said sidewall between said first attachment loop and said bottom end, wherein said second attachment loop is disposed closer to said open top end than to said bottom end;
   an attachment strap disposed on said spine of said sidewall at or near said open top end, said attachment strap comprising a first end portion and a second end portion, and wherein said first end portion is disposed on said sidewall and wherein a second end portion is attachable to said bag via one or more fastener components, and wherein said first and second attachment loops and said attachment strap are disposed in a linear placement with relation to the other such that each can receive or coordinate with a line that runs along at least a portion of said spine of said sidewall, and wherein said first compartment is oriented to receive contents through said open top end from a direction at least substantially parallel to said spine; and
   a second compartment, disposed on said sidewall, said second compartment comprising:
   an open top;
   a closed bottom; and
   an outer sidewall.

2. The carrying apparatus of claim 1 wherein said attachment strap comprises a total length of between two to twelve inches.

3. The carrying apparatus of claim 1 wherein said one or more fastener components are positioned such that when said second end portion of said strap is attached to said bag via said one or more fastener components, said strap forms a loop that projects above said open top end of said first compartment by at least one inch.

4. The carrying apparatus of claim 1 further comprising an outlet disposed in said outer sidewall of said second compartment.

5. The carrying apparatus of claim 4 wherein said outlet comprises a grommet.

6. The carrying apparatus of claim 1 wherein said first and second attachment loops comprise elastic material.

7. The carrying apparatus of claim 1 further comprising a handle at or near said bottom end.

8. The carrying apparatus of claim 1 wherein said bag, said second compartment, said first and second attachment loops, and said attachment strap comprise a nylon material.

9. The carrying apparatus of claim 1 wherein said open top end is substantially horizontal when said spine of said sidewall is substantially vertical.

10. The carrying apparatus of claim 1 further comprising a line comprising a loop, and wherein said attachment strap goes through the loop of said line.

11. A container comprising:
   a first compartment comprising an open top, a closed bottom and a sidewall comprising a spine;
   a second compartment disposed on said first compartment comprising an open top, a closed bottom, and an outlet formed in a side thereof;
   a first set of fastener components disposed on said sidewall configured to close said open top of said first compartment;
   at least one loop disposed on said spine of said sidewall, said at least one loop configured such that it can encircle a vertically-oriented line when said container is disposed with said open top of said first compartment disposed directly above said closed bottom of said first compartment, and wherein a first loop of said at least one loop is disposed on said first compartment at or near its open top, said container further comprising a second loop disposed on said first compartment between said first loop and said closed bottom of said first compartment closer to said open top than to said closed bottom; and
   a strap disposed on said spine of said sidewall configured to form a loop which can encircle a horizontally-oriented line disposed adjacent to said open top of said first compartment, wherein said at least one loop and said strap are disposed in a linear placement with relation to the other such that each can receive or coordinate with a line that runs along at least a portion of said spine of said closed sidewall, and wherein said first compartment is oriented to receive contents through said open top from a direction at least substantially parallel to said spine.

12. The container of claim 11 further comprising a second set of fastener components disposed on said strap and said container configured to removably secure said strap to said container.

13. The container of claim 11 wherein each of said at least one loop comprises elastic material.

14. The container of claim 11 further comprising a handle at or near said closed bottom of said first compartment.

15. A method of forming a bag comprising:
   forming a first compartment having an open top end, a closed bottom end opposite the top end and a sidewall comprising a spine;
   disposing first and second attachment loops on the spine of said sidewall such that the first and second loops each encircle a respective one of at least substantially vertical axes when the line-attachable bag is positioned with the open top end of the first compartment directly above the closed bottom end and such that the first loop of said at least one loop is disposed on the first compartment at or near its open top end, and the second loop is disposed on the first compartment between the first loop and the closed bottom end closer to the open top end than to the closed bottom end;
   attaching to the first compartment a first end portion of an attachment strap, wherein the first and second loops and the attachment strap are disposed in a linear placement with relation to each other such that each can receive or coordinate with a line that runs along at least a portion of the spine of said sidewall, and wherein the first compartment is oriented to receive contents through the open top end from a direction at least substantially parallel to the spine;
   providing a first fastener component on a second end portion of the strap that is configured to communicably couple to a second fastener component disposed on the first compartment, and wherein when so communicably coupled, the attachment strap forms a loop that encircles an at least substantially horizontal axis; and
   forming a second compartment having an open top and a closed bottom by attaching material to an outer portion of the sidewall of the first compartment.

16. The method of claim 15 wherein forming a second compartment further comprises providing an outlet in a sidewall of the second compartment.

17. The method of claim 15 wherein the first and second fastener components are positioned such that when the second end portion of the strap is attached to the bag via the first and second fastener components, the strap forms a loop that can extend above the open top end of the bag by at least one inch.

* * * * *